May 6, 1924.
R. H. MASSIE
FRUIT GRADER
Filed Sept. 16, 1922     3 Sheets-Sheet 1
1,493,364
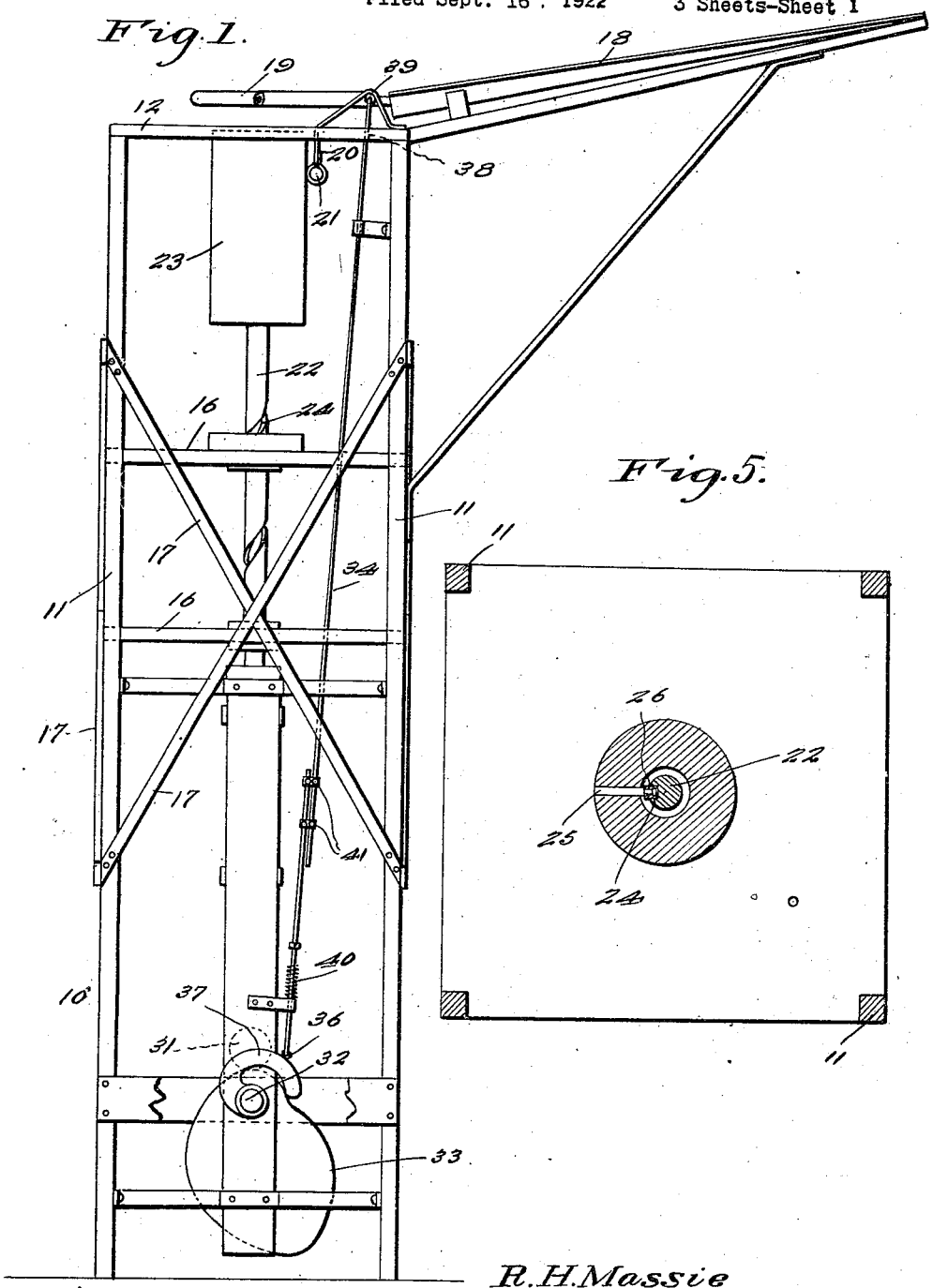

May 6, 1924.
R. H. MASSIE
FRUIT GRADER
Filed, Sept. 16, 1922  3 Sheets-Sheet 2
1,493,364
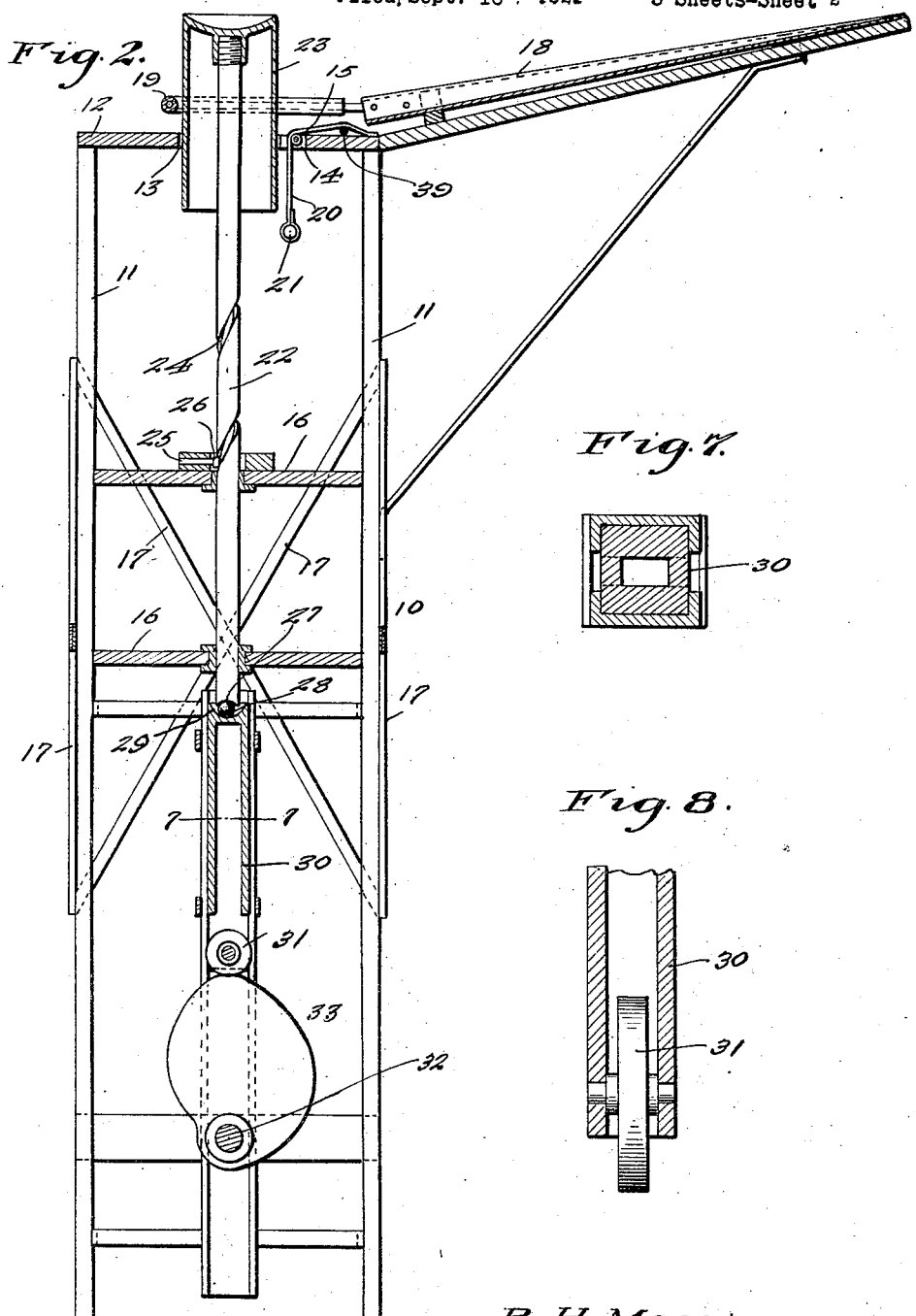

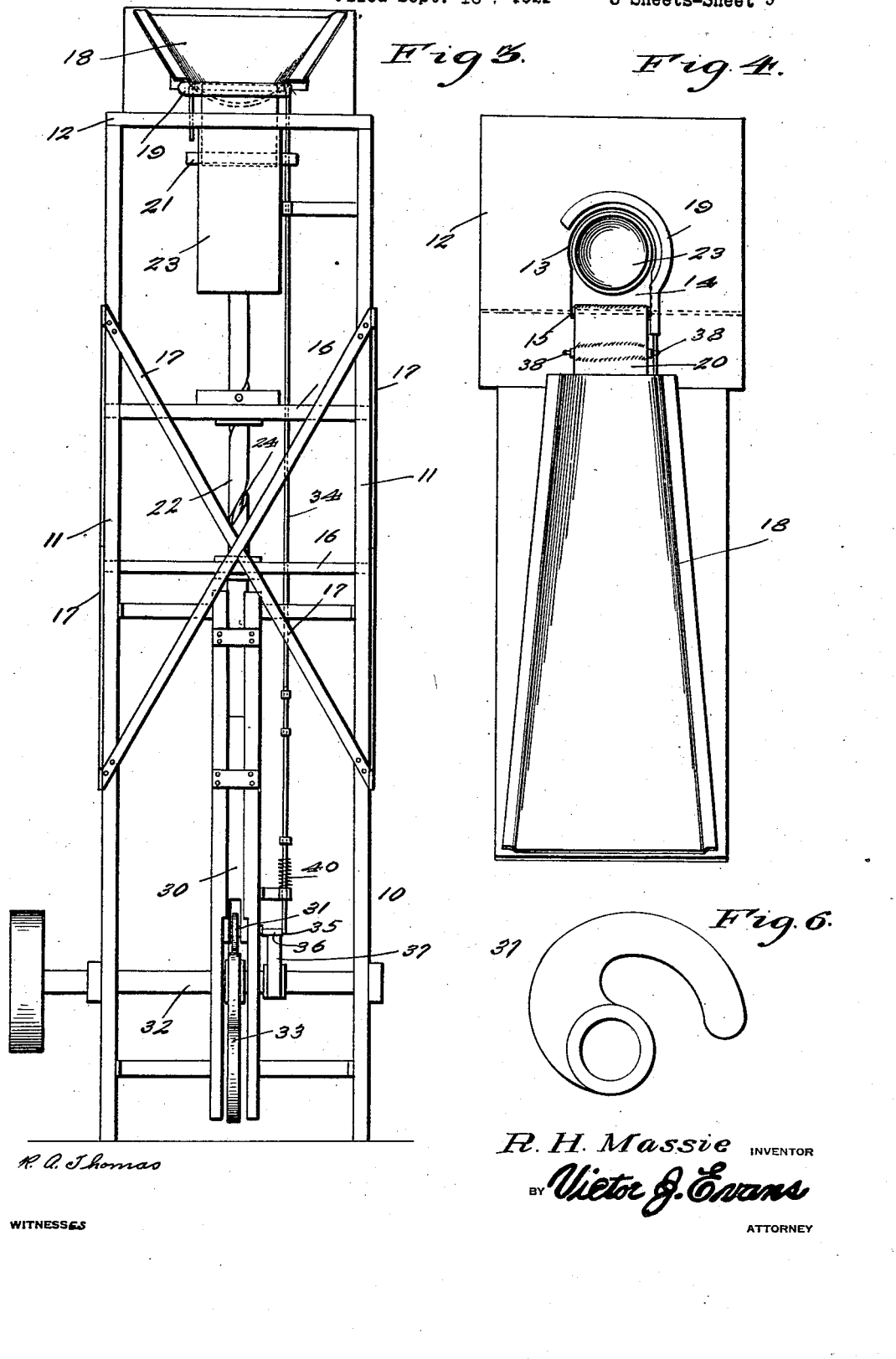

Patented May 6, 1924.

1,493,364

UNITED STATES PATENT OFFICE.

RICHARD H. MASSIE, OF BREWSTER, WASHINGTON.

FRUIT GRADER.

Application filed September 16, 1922. Serial No. 588,667.

*To all whom it may concern:*

Be it known that I, RICHARD H. MASSIE, a citizen of the United States, residing at Brewster, in the county of Okanogan and State of Washington, have invented new and useful Improvements in Fruit Graders, of which the following is a specification.

This invention relates to devices for handling fruit during sorting and packing thereof, and has for its object the provision of a novel device for raising, automatically, the individual pieces of fruit and turning them so that an operator packing the fruit in boxes or the like may have a full view of all sides of the fruit as well as the top and bottom thereof and be enabled to determine the grade so that proper sorting may be carried out.

An important and more specific object is the provision of a power driven device of this character provided with automatic feed means for allowing only one piece of fruit at a time to pass to a vertically moving and rotating plunger.

Another object is the provision of a device of this character provided with peculiar means for effecting rotation of the plunger simultaneously with its vertical movement so that all sides of the fruit will be effectively displayed to the operator.

An additional object is the provision of a machine of this character which will be comparatively simple and inexpensive in manufacture, positive in operation, efficient and durable in service and a general improvement in the art.

With the above and other objects and advantages in view the invention consists in the details of construction to be hereinafter more fully described and claimed and illustrated in the accompanying drawings, in which:

Figure 1 is a side elevation of the device with the plunger in lower most position, Figure 2 is a vertical section with the plunger in its highest position, Figure 3 is an elevation at right angles to Figure 1, Figure 4 is a plan view, Figure 5 is a detail cross section, Figure 6 is an enlarged detail view of the trip mechanism for controlling the feed rod, Fig. 7 is a cross-section on the line 7—7 of Fig. 2, Fig. 8 is a sectional view of the lower portion of the plunger shaft.

Referring more particularly to the drawings I have shown my device as comprising a supporting stand 10 including a plurality of upright legs 11 connected at their tops by a table 12 which is formed with a circular hole 13 adjacent which is a slot 14 having a roller 15 journaled therein. The legs are connected at intervals by cross members 16 and any desired number or character of braces 17 may also be employed for making the structure strong and durable.

Carried by the upper end of the stand is a metallic trough 18 designed to hold apples or other fruit to be inspected and this trough is inclined as shown and is suitably secured to the table. Carried by the smaller end of this trough is a guard 19 which may be formed as a wire frame covered with rubber tubing or the like so as not to bruise the fruit. This guard is arranged in partially encircling relation to the circular hole 13 and is located somewhat above the top of the table so as to prevent fruit passing onto the table from falling off. Secured to the smaller end of the trough is a canvas apron 20 which extends over the roller 15 in the slot 14 and which has its depending end carrying a weight 21. This apron serves to conduct the fruit from the trough to the hole in the table.

Slidably and rotatably mounted through the cross piece 16 in the stand is a shaft 22 having its upper end carrying a concaved plunger head 23 which operates through the hole 13 in the table for receiving the individual pieces of fruit and raising them for inspection. This shaft is formed with a spiral groove 24 within which engages a pin 25 carrying a roller 26, the pin being secured on one of the cross members 16 and operating to cause the plunger to rotate when it is moved lengthwise. The lower end of the plunger shaft is concaved as shown at 27 and fits over a ball 28 engaged within the concaved upper end 29 of a follower 30 which is slidable through the lower cross piece 16 of the stand and which has its lower end carrying a roller 31. Journaled in the lower portion of the stand is a shaft 32 carrying a cam 33 which engages the roller 31. This cam is of peculiar shape as shown in one of the detail views so that it will move the follower and plunger upwardly rather slowly but permit these parts to drop rather suddenly. Any suitable power device may be used for driving the shaft 32 either manually or by means of an electric or other motor, the speed being variable to meet the requirements of the operator making the inspection.

Slidably mounted in the stand is a feed rod 34 which has its lower end formed with a lateral extension 35 carrying a roller 36 in the path of travel of a trip hook 37 on the shaft 32 and having its upper end formed U-shaped and slidable through holes 38 in the table. The bight portion of the U-shaped upper end of this feed rod carries a roller 39 engaging the underside of the canvas apron 20 at a point spaced from the table. Intermediate its ends this feed rod is provided with a shock absorbing spring device 40 and an adjustment 41 which will permit variations in the length.

The operation is as follows: Apples or other fruit to be inspected and graded are placed upon the trough 18 and the shaft 32 is rotated by whatever means may be provided. The fruit will pass by gravity down the inclined trough onto the apron 20 and the first piece of fruit will pass onto the table at the hole 13. The rotation of the cam 33 will cause the follower 30 to be moved upwardly, carrying with it the plunger shaft 22 whereupon the plunger head 23 passing up through the hole 13 will engage the piece of fruit and raise it while at the same time the fruit will be rotated owing to the provision of the spiral groove 24 co-acting with the roller 26. As this movement occurs the operator has ample opportunity in which to inspect all sides of the fruit to ascertain what sorting may be made. As the shaft 32 rotates, the cam hook 37 thereon will raise the feed rod 34 so that the roller 39 at the upper end thereof will press the canvas apron 20 upwardly between the first piece of fruit and the next so that the fruit will be held back and be prevented from passing onto the table until the plunger returns to normal or lowered position at which time the previously inspected piece of fruit is removed by the operator. As the shaft 32 continues to rotate, the feed rod 34 returns to lowered position and the next piece of fruit is permitted to roll onto the table. This action is automatic as long as the shaft 32 is in operation.

From the foregoing description and a study of the drawings it will be apparent that I have thus provided a simply constructed and easily operated machine which will insure thorough inspection of fruit and facilitate sorting or grading thereof. The device has the advantage of working automatically and saving handling of the fruit to a great extent. Another feature is the fact that possibility of bruising is guarded against so that the fruit will be maintained in a proper condition. Owing to the simplicity of the construction and the fewness of the parts it is apparent that there is nothing to get out of order so that the device should have a long life and satisfactorily perform all of its functions.

While I have shown and described the preferred embodiment of the invention it is of course to be understood that I reserve the right to make such changes in the form, construction and arrangement of parts as will not depart from the spirit of the invention or the scope of the subjoined claims.

I claim:

1. A fruit grader comprising a supporting stand, a table at the upper end thereof formed with a hole, an inclined trough leading to the table, a vertically movable and rotatable plunger operating through said hole for receiving the individual pieces of fruit to be graded, and step by step feed means associated with the trough.

2. A fruit grader comprising a supporting stand, a table at the upper end thereof formed with a hole, an inclined trough leading to the table, a vertically movable and rotatable plunger operating through said hole for receiving the individual pieces of fruit to be graded, and step by step feed means associated with the trough, consisting of a canvas apron leading from the trough and passing through a slot in the table with its depending end weighted, and a vertically movable rod engaging the apron for moving the same upwardly at intervals to check the passage of fruit thereover.

3. A fruit grader comprising a supporting stand carrying a table formed with a hole and a slot, a vertically movable and rotatable shaft mounted within the stand and having a plunger head operating through said hole, means for raising and lowering said plunger shaft, an inclined trough carried by the stand, an apron leading from the trough through the slot in the table and having a weighted end, and a cam operated vertically movable feed rod slidable through the stand and having its upper end engaging beneath the underside of the apron adjacent the table to permit passage of the fruit one by one simultaneously with actuation of the plunger shaft.

4. A machine of the character described comprising a supporting stand provided at its top with a table having a circular hole, an inclined trough leading to the table and including a flexible section connecting the trough with the table, a vertically movable shaft within the stand carrying a plunger head operating through said hole, said shaft being formed with a spiral groove, a roller engaging within the groove for effecting rotation of the shaft when longitudinal movement occurs, a vertically slidable follower mounted within the stand, a power driven shaft, a cam on the power shaft engaging the follower for raising and lowering the same, and a vertically movable cam operated feed rod driven by said power shaft and engaging the flexible section of the trough for effecting step by step passage of fruit to the table.

5. In a device of the character described, a supporting stand, a plunger vertically movable through the top thereof and adapted to support an object to be inspected, means for moving said plunger up and down and means for simultaneously rotating the same.

6. In a device of the character described, a supporting stand, a plunger movably mounted through the top thereof and adapted to support an object to be inspected, cam means for moving said plunger up and down at different speeds, and means simultaneously operating to rotate the plunger.

7. In a device of the character described, a stand, a table at the upper end thereof, a vertically movable plunger operating through said table and adapted to receive and hold an object to be inspected, means for moving said plunger vertically and simultaneously rotating the same, and feed means for depositing objects upon the lunger.

8. In a device of the character described, a stand, a table at the upper end thereof, a vertically movable plunger operating through said table and adapted to receive and hold an object to be inspected, means for moving said plunger vertically and simultaneously rotating the same, feed means for depositing objects upon the plunger, a check in said feed means for permitting the objects to pass one by one.

9. In a device of the character described, a stand, a table thereon, a feed trough, a vertically movable and rotatable plunger operating through the table, cam means for moving said plunger up and down and simultaneously rotating the same, a check means on said trough for permitting objects thereon to pass one by one onto the plunger, and means for operating said check means.

10. In a device of the character described, a stand, a table thereon, a feed trough, a vertically movable and rotatable plunger operating through the table, cam means for moving said plunger up and down and simultaneously rotating the same, a check means on said trough for permitting objects thereon to pass one by one onto the plunger, means for operating said check means, and cam means for operating said checking mechanism.

In testimony whereof I affix my signature.

RICHARD H. MASSIE.